Patented Dec. 10, 1940

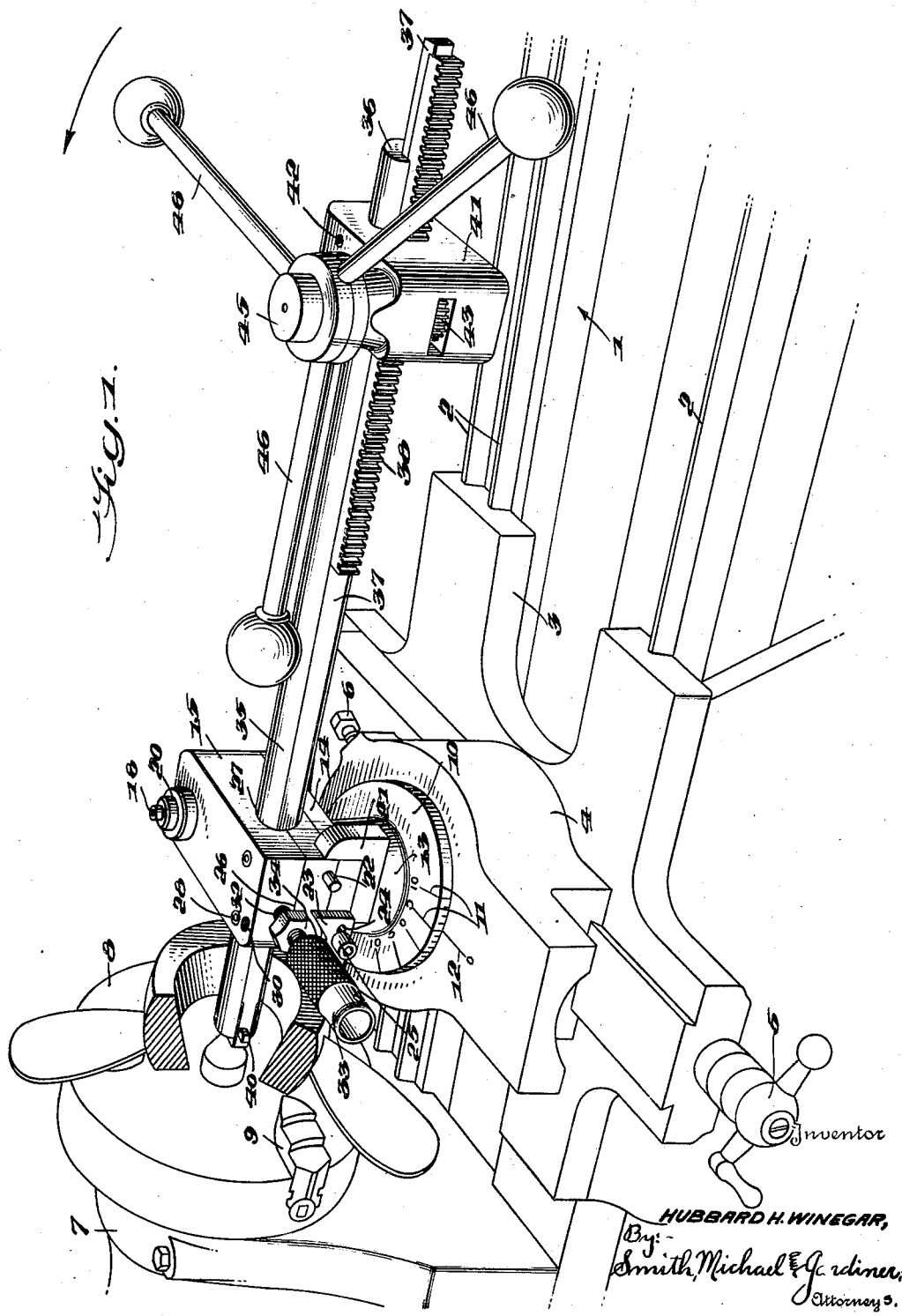

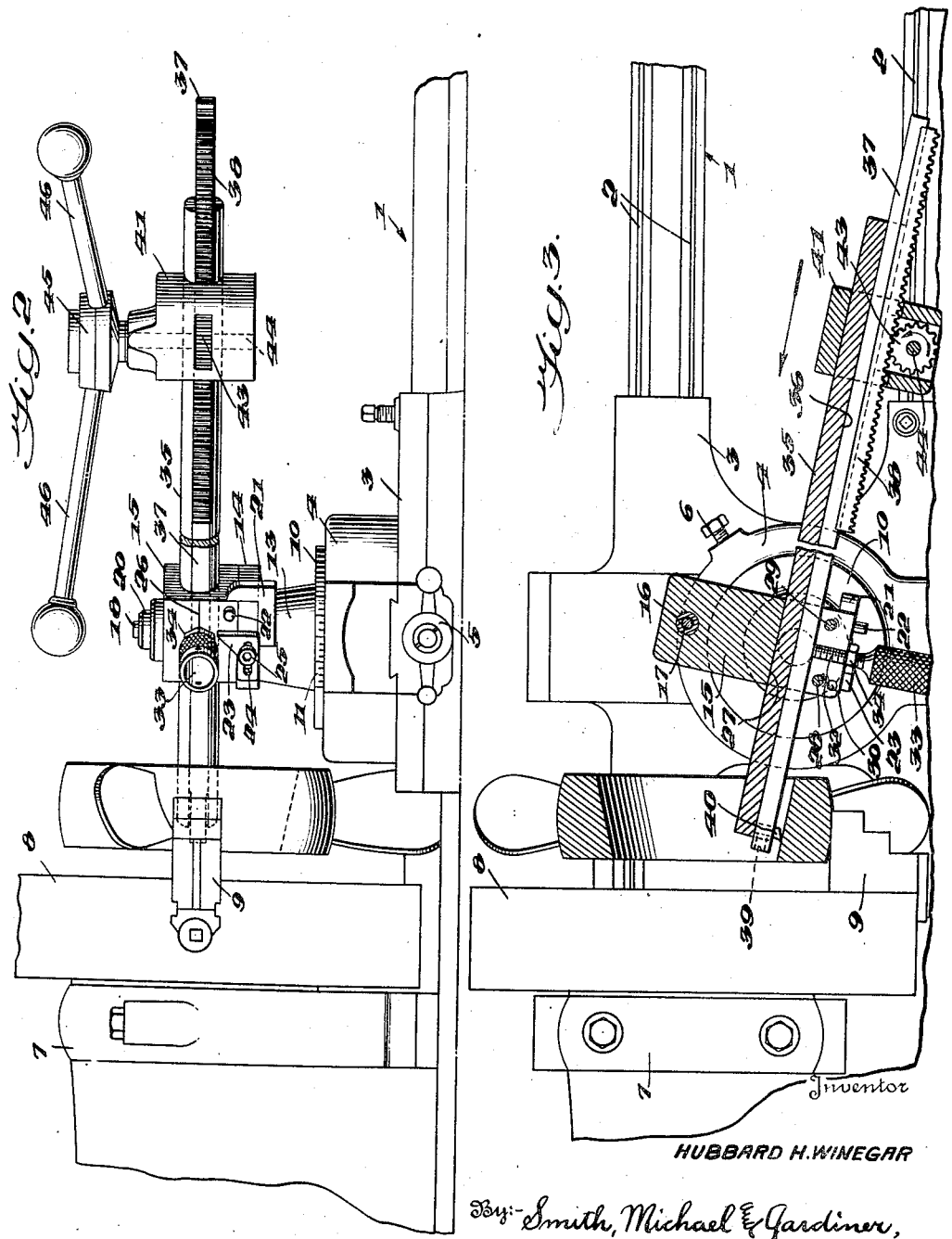

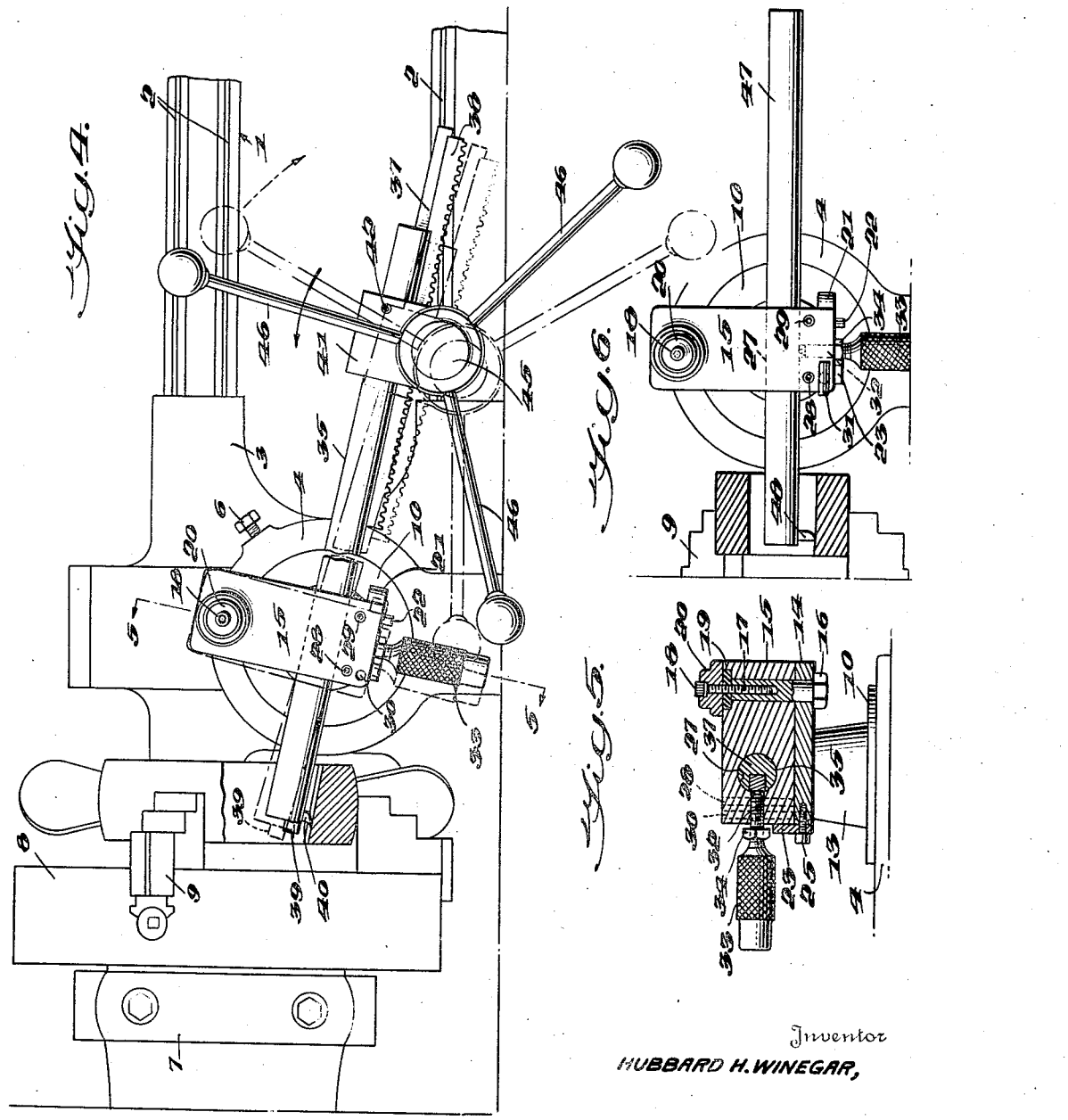

2,224,531

UNITED STATES PATENT OFFICE 2,224,531

METALWORKING ATTACHMENT FOR LATHES

Hubbard H. Winegar, Palatka, Fla.

Application March 20, 1940, Serial No. 325,051

13 Claims. (Cl. 90—41)

My invention relates to a metalworking attachment for lathes, and has particular reference to a device adapted for ready attachment to and removal from the cross-slide of a standard or conventional lathe after the usual tool-post of the lathe has been removed therefrom, and is primarily designed for use in cutting or planing an interior groove or key-way in the hub of a propeller, gear, pulley, wheel or the like.

It is an object of my invention to provide a relatively simple and highly efficient metalworking attachment for lathes, which attachment may be readily mounted on the cross-slide of a standard or conventional lathe after the ordinary tool-post has been temporarily removed from the lathe, and which attachment includes a novel means for mounting a reciprocable cutter bar in proper angular position for cutting an interior groove or key-way in the straight or tapered bore of the hub of a propeller, gear, or other work piece mounted in the chuck of the lathe.

It is an object of my invention to provide a device of the above mentioned character including a reciprocable cutter bar having at its forward end a cutter, and to so mount the cutter bar that during the forward stroke thereof the cutter acts on the work piece to cut or plane the groove or key-way and during its return or backward stroke is automatically rocked about its mounting to relieve the cutter from contact with the work piece.

It is an object of my invention to provide a device of the above mentioned character including a reciprocable cutter bar having at its forward end a cutter, and to provide a pivotally mounted supporting block for said cutter bar and through which the said cutter bar is reciprocated, the said block cooperating with stops which limit its pivotal movement to retain the cutter in contact with the workpiece during the forward movements of the cutter bar but which permit the block to pivot to a limited extent to relieve the cutter from contact with the work piece during the return or backward stroke of the cutter bar.

It is a further object of my invention to provide a device of the above mentioned character including a pivotally mounted supporting block for the reciprocating cutter bar, which block partakes of limited pivotal movements about a vertical axis as the cutter bar is moved longitudinally into and out of contact with the work piece, whereby the cutter carried by the bar contacts the work piece as the cutter bar is moved into the bore of the work piece to cut or plane the groove or key-way therein and is relieved from contact with the work piece as the cutter bar is moved out of the bore of the work piece, the movements of said block and the cutter bar carried thereby being effected automatically upon actuation of the mechanism which moves the cutter bar into and out of the bore of the work piece.

It is a further object of my invention to provide a device of the above mentioned character in which the block may be locked against pivotal movement when the groove or key-way cutting bar is removed from the attachment and is replaced by a conventional boring tool or the like.

It is a still further object of my invention to provide a device of the above mentioned character wherein the reciprocating cutter bar is slidably mounted in a relatively heavy guide bar which is longitudinally adjustable within the supporting block and which may be clamped in various positions therein, so that the cross-slide of the lathe, the supporting block and the end of the guide bar carrying the cutter may be placed closely adjacent the work piece mounted in the chuck of the lathe and the cutter bar projected a minimum distance beyond the end of the guide bar to bring the cutter into contact with the work piece during the groove or key-way cutting or planing operation, whereby the cutter bar is rigidly supported adjacent the work piece and the tendency of the cutter bar to bend and/or "chatter" is definitely eliminated.

It is a still further object of my invention to provide a metalworking attachment for lathes that is simple in construction and operation, cheap and easy to manufacture, strong and durable, and highly efficient in the purposes for which designed.

In the accompanying drawings wherein, for the purpose of illustration, I have shown a preferred embodiment of my invention, Figs. 1 and 2 are, respectively, perspective and side elevational views of a portion of a standard or conventional metalworking lathe showing the metalworking attachment of my present invention mounted thereon, Fig. 3 is a plan view, partly in section, and showing the relation of parts as the cutter is being forced into the bore of a propeller to cut or plane an interior groove or key-way therein, Fig. 4 is a plan view, partly in section, of a portion of a standard or conventional metalworking lathe showing the metalworking attachment of my present invention mounted thereon, and showing, respectively, in full and broken lines, the relation of parts as the cutter bar is being forced into the bore of a propeller to cut or plane an interior groove or key-way therein, and as the cutter bar is being withdrawn or retracted, Fig. 5 is a vertical sectional view on the line 5—5 of Fig. 4, and Fig. 6 is a fragmentary plan view, partly in section, of a portion of a standard or conventional metalworking lathe showing a portion of the metalworking attachment of my present invention mounted thereon, but showing the cutter bar and its operating mechanism replaced by a conventional boring bar or the like.

Referring to the accompanying drawings in detail and employing like reference numerals to designate like parts throughout the several views, the numeral 1 designates broadly the bed of a standard or conventional metalworking lathe of any desired or preferred construction and including the usual spaced, parallel V-guides 2 for the longitudinally movable carriage 3 on which is mounted a cross-slide 4 adjustable transversely of the lathe by means of an operating screw (not shown) rotated by the handle 5.

Ordinarily in lathes of this type, a tool-post is mounted within a recess or chamber in the top of the cross-slide 4 and is retained therein by a locking screw 6 which clamps the tool-post in position and which may be loosened to permit the tool-post to be detached from the cross-slide. The head-stock 7 of the lathe contains the usual driven head-stock spindle which drives a chuck 8 provided with the usual radially adjustable jaws 9 for rigidly clamping a work piece, such as a propeller, gear, pulley or the like, on the chuck. As will be readily understood by those skilled in the art, the lathe includes suitable mechanism for rotating the head-stock spindle and the chuck 8 during turning or boring operations, and also includes a lead screw for automatically feeding the carriage 3 longitudinally of the lathe, and a hand operated crank or hand wheel for manually effecting the carriage feed. All of the above details of construction are old and well known in the art and form no part of my present invention.

When it is desired to cut an interior groove or key-way in the bore of the hub of a propeller, gear, pulley, wheel or other work piece, the ordinary tool-post is removed from the cross-slide 4 of the lathe by loosening the clamping screw 6 and lifting the said tool-post out of the recess or chamber in the cross-slide. The metalworking attachment of my present invention is then placed in the recess or chamber in the upper surface of the cross-slide 4 and is clamped in position therein by means of the clamping screw 6, it being noted that the base flange 10 of my attachment is provided with suitable graduations 11 which cooperate with a fixed mark 12 on the upper face of the cross slide 4 so that the attachment may be arranged and clamped in various angular positions to permit the attachment to properly function with hubs or the like having straight or tapered bores therein.

Immediately above the central portion of the base flange 10 and preferably formed integrally therewith, is an upwardly-tapered pedestal 13 which supports at the top thereof a flat base plate 14 which is preferably formed integrally with the said pedestal and base flange, and which overhangs the said pedestal at the rear thereof as shown in the accompanying drawings. This flat base plate 14 supports a relatively thick block 15 whose width and depth are substantially co-extensive with the width and depth of the base plate 14, the said base plate 14 and block 15 being provided with aligned passages near the rear edge thereof to receive therein a headed bolt 16 having an interiorly threaded bore adapted to receive therein the threaded shank 17 of a screw 18 preferably of the knurled headed, socketed type. The bolt 16 is inserted upwardly through the base plate 14 and block 15 with the head of the said bolt engaging the lower face of the base plate; a washer 19 is inserted above the upper end of said bolt; a washer 20 is placed on the upper surface of the block 15, and the screw 18 is passed through the washers 20 and 19 and rotated to cause threaded engagement between the shank 17 of the screw 18 and the interiorly threaded bore of the bolt 16. The bolt 16 and its associated parts above described, constitute a vertical pivot for the block 15, i. e., the block 15 can partake of pivotal movement across the upper surface of the base plate 14 and about the bolt 16, the extent of said pivotal movement in a counterclockwise direction being limited by engagement of the side of the block with a fixed stop 21 secured to and extending above the upper surface of the base plate, and being limited in a clockwise direction by engagement of a pin 22 projecting from the front face of the block 15 with a stop 23 secured to and extending above the upper surface of the base plate, this stop 23 having an elongated, longitudinally extending slot 24 therein through which passes a socketed screw 25 by means of which the extent of the clockwise pivotal movement of the block 15 may be readily adjusted.

The block 15 is split or cut longitudinally at its forward edge as indicated at 26, this split or cut having an appreciable thickness and extending rearwardly of the block and parallel to the top and bottom faces thereof and toward the rear edge of the block where it intersects the axis of a transverse bore or passage 27, the purpose of which will be hereinafter described. The block 15 is provided near the front edge thereof with a pair of spaced, vertical openings which extend through substantially the entire depth of the said block and are threaded to receive therein clamping screws 28 and 29, preferably of the knurled headed, socketed type. Due to the fact that the split or cut 26 has an appreciable thickness, the portions of the block above and below said split or cut constitute resilient jaw members, and when the screws 28 and 29 are screwed tightly into their vertical openings, these jaw members are drawn or forced together whereby a tool or the like positioned within the bore or passage 27 is rigidly clamped in adjusted position therein. Ordinarily the block 15 is free to pivot about the bolt 16 between the limits defined by the stops above referred to, but in order to lock the said block against such pivotal movements, I provide the block and the base plate 14 with aligned, vertical openings located near the front edges of said block and said base plate and extending completely through said block and into or through the said base plate. These aligned openings, designated broadly by the reference numeral 30, are adapted to receive therein a suitable pin or bolt 31 (see Fig. 6) whereby the block 15 is prevented from pivoting about the bolt 16. The front, adjacent walls of the block 15 immediately above and below the split or cut 26 are provided with complementary threaded portions extending rearwardly from the front face of said block to the wall defining the bore or passage 27 and are adapted to receive therein a screw or bolt 32 provided with a knurled handle 33 whereby the said screw may be extended into the bore or passage 27 to bear against a tool positioned within said bore or passage. Preferably the screw or bolt 32 is provided with a lock nut 34 to retain the same in its adjusted position.

Passing through the bore or passage 27 in the block 15 is a guide bar 35 of circular cross-section and of appreciable length, which guide bar is provided with an axial slot 36 extending throughout the entire length thereof. The guide bar 35 is rigidly clamped within the passage 27 in the block 15 by means of the clamping screws 28 and 29 and is positioned so that the axially extending slot 36 faces toward the front of the lathe. Slidably mounted within the slot 36 is a cutter bar 37, to the outer surface of which, near one end thereof, is secured an elongated gear rack 38. The end of the cutter bar 37 opposite that to which the gear rack is secured, is provided with an axially extending opening adapted to receive a set screw 39 (see Fig. 3) which bears upon an insertable, radially extending cutter 40 positioned within a transverse opening near the end of the cutter bar.

As a means for effecting axial reciprocation of the cutter bar 37 with respect to the guide bar 35 within which it is mounted, I mount near the right-hand end of the bar, as viewed in the accompanying drawings, an apertured block 41 which is clamped in adjusted position on the guide bar by means of a clamping screw 42. This block 41 is recessed to accommodate therein a spur gear 43 keyed upon a vertical shaft 44, to the upper end of which is keyed an operating knob 45 provided with three radial arms 46, the arrangement being such that upon rotation of the knob 45, the gear 43 which meshes with the rack 38, is rotated and causes the cutter bar 37 to move toward or away from the work piece mounted within the chuck 8, the direction of movement of the cutter bar being determined by the direction of rotation of the knob 45.

When it is desired to use the attachment as a means for supporting and operating a boring tool, the clamping screws 28 and 29 are loosened, the set screw 39 is loosened, and the cutter 40 is removed from the cutter bar 37. The guide bar 35 is then removed from the block 15 and a boring bar 47 is passed through the opening 27 in the block 15 and is clamped rigidly therein by means of the clamping screws 28 and 29. During the boring operation, the block 15 is retained against pivotal movement by inserting the pin 31 into the aligned openings 30 in the block 15 and base plate 14. The boring bar 47 carries near the inner end thereof a cutter 48, it being understood that the axial and radial movements of the boring bar and its associated cutter 48 are effected by proper manipulation of the appropriate lathe mechanisms. In the event that the diameter of the boring bar 47 is appreciably less than the diameter of the passage 27 through the block 15, a split bushing of proper diameter may be inserted within said passage so that the boring bar may be readily clamped within the block 15.

Assuming that it is desired to cut a slot or keyway in the bore of the hub of a propeller, the propeller is rigidly clamped within the stationary chuck 8 by manipulation of the radially movable jaws 9. The usual tool-post having been removed from the cross-slide 4 of the lathe, the attachment forming the subject-matter of my present invention is inserted within the recess in the upper surface of the cross-slide 4 and is rigidly clamped therein by means of the clamping screw 6. If the bore of the hub is tapered, the proper graduation 11 on the base flange 10 is aligned with the fixed graduation 12 on the upper surface of the cross-slide 4 prior to clamping the attachment in position on said cross-slide. The carriage 3 is moved longitudinally of the bed of the lathe until it is closely adjacent the end of the propeller hub and, after the clamping screws 28 and 29 have been loosened, the guide bar is projected to the left of the block 15 as viewed in the accompanying drawings, so that the inner end of said guide bar projects into the bore of the hub. The screws 28 and 29 are then tightened to rigidly clamp the guide bar in the block 15 and the screw 32 is rotated by means of the knurled handle 33 until the inner end of said screw bears lightly upon the outer face of the cutter bar 37, whereupon the lock nut 34 is tightened to retain the screw 32 in contact with said cutter bar. The cross-slide 4 is then actuated by the operating handle 5 so that the cutter 40 is properly positioned with respect to the inner surface of the bore of the propeller hub.

The operator then grasps one of the radially extending arms 46 and moves the same in a counter-clockwise direction, whereupon the knob 45, shaft 44, and gear 43 will be rotated in a counter-clockwise direction, which causes the rack 38 and the cutter bar 37 to which it is secured to force the cutter 40 into the bore of the propeller hub to make the initial cut of the keyway. As the cutter bar is moved into the bore of the propeller hub the right hand side of the block 15, as viewed in the accompanying drawings, engages the fixed stop 21 projecting from the base plate 14. When this first inward or "cutting" stroke has been completed, the operator moves the arm 46 in a clockwise direction, whereupon the knob 45, shaft 44, and gear 43 will be rotated in a clockwise direction, which causes the rack 38 and the cutter bar 37 to which it is secured to move the cutter 40 out of the bore of the propeller hub, it being particularly noted that the initial clockwise movement of the arm 46 will cause the block 15 to rotate in a clockwise direction about its pivotal mounting until the pin 22 contacts the stop 23. As clearly shown in dotted lines in Fig. 4 of the accompanying drawings, this movement of the block 15 causes the cutter 40 to move out of contact with the bore of the propeller hub and, hence, as the arm 46 is moved further in a clockwise direction, the cutter bar 37 and its associated cutter 40 are moved out of the bore of the propeller hub. The cross-slide 4 is then moved a slight distance toward the front of the lathe which brings the cutter into position for the next cut of the keyway. The radial arm 46 is then moved in a counterclockwise direction, which again causes the block 15 to move about its pivotal mounting until the side of said block contacts the fixed stop 21; continued movement of the arm 46 in a counter-clockwise direction forcing the cutter bar 37 and its associated cutter 40 into the bore of the propeller hub to cut the next cut of the key-way. The arm 46 is next moved in a clockwise direction, which causes the block 15 to move about its pivotal mounting in a clockwise direction until the pin 22 contacts the stop 23, continued movement of the arm 46 in a clockwise direction causing the cutter bar 37 and its associated cutter 40 to move out of contact with the bore of the propeller, ready to be positioned and actuated to perform the next cut of the key-way. This reciprocation and oscillation of the cutter bar 37 is continued until the key-way is cut to the proper depth.

When it is desired to perform a boring operation on the hub of the work piece prior to the cutting of the groove or key-way therein, the cutter bar 37 and its associated parts are removed from the block 15 and a boring bar 47 provided with a cutter 48 is clamped in rigid position within the block 15 as clearly shown in Fig. 6 of the accompanying drawings. During the boring operation it is not necessary for the block 15 to move about its pivotal mounting and to prevent such movement of the block, the pin 31 is inserted within the opening 30 which positively prevents movement of the block 15 with respect to the stationary base 14. The reciprocating movements of the boring bar into and out of the bore of the work piece and the feeding of the cutter into the work piece to control the depth of cut, are effected by operation of the cross-slide 4 longitudinally and transversely of the bed 1 of the lathe in a manner well understood by those skilled in the art. During the boring operation the work piece is of course rotated by means of the chuck 8 driven from the head-stock of the lathe.

It will thus be seen that I have perfected an attachment for lathes which constitutes a highly satisfactory and desirable accessory for cutting a groove or key-way in the bore of a work piece, and that when desired, the attachment may be readily employed for performing boring operations on such work piece. By means of this attachment, key-way cutting or boring operations may be readily performed on hubs, gears, pulleys or the like having either straight or tapered bores. The attachment may be readily mounted on the cross-slide of a standard or conventional lathe after removal of the usual tool-post therefrom, and the cutting or planing of the groove or key-way is readily accomplished by relatively simple and efficient mechanism. As will be obvious from the above description of construction and operation, the pivoted block performs an important function in the successful operation of the device, in that it permits the cutter 40 to be automatically removed from contact with the work piece during the return or backward stroke of the cutter bar 37. By reason of the fact that the cutter bar 37 is rigidly supported throughout substantially its entire length within the groove 36 in the relatively heavy guide bar 35, there is little or no chance of the cutter bar bending or "chattering" during the cutting operations, this freedom from "chattering" being enhanced by the light engagement of the inner end of the screw 32 upon the face of the cutter bar 37 and the fact that the cross-slide 4 is positioned closely adjacent the work piece, thus necessitating only the minimum projection of the guide bar 35 to the left of its supporting block 15 as viewed in the accompanying drawings. In the event that the bore in the work piece is of less diameter than the diameter of the guide bar 35, the said guide bar cannot be positioned within the bore of the work piece, but the end of the guide bar is brought as close as possible to the work piece and the cutter bar is projected into the work piece during the key-way cutting operation.

It will be understood that the form of my invention herein shown and described is to be taken as a preferred embodiment of the invention and that various changes may be made in the shape, size and arrangement of parts without departing from the spirit of the invention or the scope of the subjoined claims.

Having thus described my invention, I claim:

1. In a key-way cutting attachment for lathes, a base adapted for mounting on the cross-slide of the lathe and adjacent a work piece mounted on said lathe, a block pivotally mounted on said base, spaced stops to limit the extent of pivotal movement of said block on said base, a cutter bar mounted on said block and reciprocable therethrough, a cutter carried by said cutter bar, and means for reciprocating said cutter bar and cutter, said means oscillating said block on said base between the limits defined by said spaced stops at the beginning of each reciprocating movement of the cutter bar and cutter to align the cutter with the work piece in one position of said block and to move the cutter out of contact with the work piece in another position of said block.

2. In a key-way cutting attachment for lathes, a base adapted for mounting on the cross-slide of the lathe and adjacent a work piece mounted on said lathe, a block pivotally mounted on said base, a cutter bar mounted on said block and reciprocable therethrough, a cutter carried by said cutter bar, a rack on said cutter bar, a pinion engaging said rack, a shaft on which said pinion is keyed, and an arm connected to said shaft and extending radially therefrom for rotating said pinion in opposite directions to reciprocate said cutter bar and cutter, said arm upon its initial movement in one direction causing said block to oscillate to align the cutter bar and cutter with the work piece and upon its initial movement in the opposite direction causing said block to oscillate to move the cutter out of contact with the work piece.

3. In a key-way cutting attachment for lathes, a base adapted for mounting on the cross-slide of the lathe and adjacent a work piece mounted on said lathe, a block pivotally mounted on said base, a first stop at one side of said base to be engaged by said block to limit its pivotal movements in one direction, a second stop on said base spaced from said first stop to be engaged by said block to limit its pivotal movements in the opposite direction, a cutter bar mounted on said block and reciprocable therethrough, a cutter carried by said cutter bar, and means for reciprocating said cutter bar and cutter, said means oscillating said block on said base between said first and second stops at the beginning of each reciprocating movement of said cutter bar and cutter to align the cutter with the work piece when said block engages said first stop and to move the cutter out of contact with the work piece when said block engages said second stop.

4. In a key-way cutting attachment for lathes, a base adapted for mounting on the cross-slide of the lathe and adjacent a work piece mounted on said lathe, a block pivotally mounted on said base, a guide bar mounted on said block, a cutter bar slidably mounted within said guide bar and reciprocable through said block and guide bar, a cutter carried by said cutter bar, and means for reciprocating said cutter bar and cutter, said means oscillating said block on said base at the beginning of each reciprocating movement of the cutter bar and cutter to align the cutter with the work piece in one position of said block and to move the cutter out of contact with the work piece in another position of said block.

5. In a key-way cutting attachment for lathes, a base adapted for mounting on the cross-slide of the lathe and adjacent a work piece mounted on said lathe, a block pivotally mounted on said base, an elongated guide bar clamped to said base and having an axially extending slot therein, a cutter bar slidably mounted within said axially extending slot for reciprocable movements therein, a cutter carried by said cutter bar, and means for reciprocating said cutter bar and cutter within the slot in the guide bar, said means oscillating said block on said base at the beginning of each reciprocating movement of the cutter bar and cutter to align the cutter with the work piece in one position of said block and to move the cutter out of contact with the work piece in another position of said block.

6. In a key-way cutting attachment for lathes, a base adapted for mounting on the cross-slide of the lathe and adjacent a work piece mounted on said lathe, a block pivotally mounted on said base, an elongated guide bar clamped to said base and having an open, axially extending slot throughout the length thereof, an elongated cutter bar of a length corresponding substantially to the length of the guide bar and mounted within the slot in the guide bar for reciprocable movements therein, a cutter carried by said cutter bar, and means supported by said guide bar for reciprocating said cutter bar and cutter within the slot in the guide bar, said means oscillating said block at the beginning of each reciprocating movement of the cutter bar and cutter to align the cutter with the work piece in one position of said block and to move the cutter out of contact with the work piece in another position of said block.

7. In a key-way cutting attachment for lathes, a base adapted for mounting on the cross-slide of the lathe and adjacent a work piece mounted on said lathe, a block pivotally mounted on said base, a guide bar clamped to said base and having an axially extending slot therein, a cutter bar slidably mounted within said axially extending slot for reciprocable movements therein, a cutter carried by said cutter bar, a rack on said cutter bar, a block supported by said guide bar, a pinion engaging said rack and adapted for rotation within said last mentioned block, and means for rotating said pinion in opposite directions to reciprocate said cutter bar and cutter within the slot in the guide bar, said means oscillating said first mentioned block at the beginning of each reciprocating movement of the cutter bar and cutter to align the cutter with the work piece in one position of said first mentioned block and to move the cutter out of contact with the work piece in another position of said first mentioned block.

8. In a key-way cutting attachment for lathes, a base adapted for mounting on the cross-slide of the lathe and adjacent a work piece mounted on said lathe; a longitudinally-split block pivotally mounted on said base and having a passage extending therethrough; a guide bar extending through the passage in the block and adapted to be rigidly clamped within said passage, said guide bar having an axially extending slot therein and said longitudinally-split block having means for forcing the split sections of the block together to clamp the guide bar within the passage in said block; a cutter bar slidably mounted within said axially extending slot for reciprocable movements therein, a cutter bar slidably mounted within said axially extending slot for reciprocable movements therein, a cutter carried by said cutter bar, and means for reciprocating said cutter bar and cutter within the slot in the guide bar, said means oscillating said block on said base at the beginning of each reciprocating movement of the cutter bar and cutter to align the cutter with the work piece in one position of said block and to move the cutter out of contact with the work piece in another position of said block.

9. In a key-way cutting attachment for lathes, a base adapted for mounting on the cross-slide of the lathe and adjacent a work piece mounted on said lathe; a first stop monuted at one side of the base and extending above the top thereof; a second stop mounted on the base at the front thereof; a block pivotally mounted on said base and having a projection at the front thereof, the extent of the pivotal movements of said block on said base being limited in one direction by engagement between the side of the block and said first stop and in the opposite direction by engagement between the projection on the block and said second stop; a cutter bar mounted on said block and reciprocable therethrough; a cutter carried by said cutter bar; and means for reciprocating said cutter bar and cutter, said means oscillating said block on said base between the limits defined by said stops at the beginning of each reciprocating mevement of the cutter bar and cutter to align the cutter with the work piece when said block is in engagement with said first stop and to move the cutter out of contact with the work piece when said projection on said block is in contact with said second stop.

10. In a key-way cutting attachment for lathes as defined in claim 9, wherein the second stop on the base is adjustable with respect to the first stop to limit the extent to which the cutter moves out of contact with the work piece when the projection on the block contacts said second stop.

11. In a key-way cutting attachment for lathes, a base adapted for mounting on the cross-slide of the lathe and adjacent a work piece mounted on said lathe, a block pivotally mounted on said base, a cutter bar mounted on said block and reciprocable therethrough, a cutter carried by said cutter bar, means for reciprocating said cutter bar and cutter, said means normally oscillating said block on said base at the beginning of each reciprocating movement of the cutter bar and cutter to align the cutter with the work piece in one position of said block and to move the cutter out of contact with the work piece in another position of said block, and means for locking said block against movement on said base when oscillatory movements of said block on said base are not desired.

12. In a key-way cutting attachment for lathes, a base adapted for mounting on the cross-slide of the lathe and adjacent a work piece mounted on said lathe, said base having an opening therein; a block mounted on said base for limited pivotal movements thereon, said block having an opening therein, which opening, when said block is in one position on said base, is aligned with the opening in said base; a cutter bar mounted on said block and movable therewith; a cutter carried by said cutter bar; means for reciprocating said cutter bar and cutter with respect to said work piece; and a pin insertable in the openings in the base and in the block when said openings are aligned, to prevent pivotal movements of said block on said base.

13. In a key-way cutting attachment for lathes, a base adapted for mounting on the cross-slide of the lathe and adjacent a work piece mounted on said lathe; a block pivotally mounted on said base and having a passage extending therethrough; a cutter bar mounted on said block and reciprocable through the passage therein; a cutter carried by said cutter bar; means for reciprocating said cutter bar and cutter with respect to said block, and means oscillating said block on said base at the beginning of each reciprocating movement of the cutter bar and cutter to align the cutter with the work piece in one position of said block and to move the cutter out of contact with the work piece in another position of said block; and a bolt passing through said block and into the passage in the block, rotation of said bolt causing its inner end to bear lightly upon the cutter bar to steady said bar during its reciprocating movements.

HUBBARD H. WINEGAR.